(12) United States Patent
Krcma et al.

(10) Patent No.: US 8,747,007 B2
(45) Date of Patent: Jun. 10, 2014

(54) DECORATING PEN (75) Inventors: Shawn R. Krcma, St. Louis Park, MN (US); Ivan Guarin, St. Louis Park, MN (US)

(73) Assignee: Northland Aluminum Products, Inc., Minneapolis, MN (US)

( * ) Notice: Subject to any disclaimer, the term of this patent is extended or adjusted under 35 U.S.C. 154(b) by 486 days.

(21) Appl. No.: 13/109,039

(22) Filed: May 17, 2011

(65) Prior Publication Data
US 2012/0294667 A1 Nov. 22, 2012

(51) Int. Cl.
*A23P 1/00* (2006.01)
*A23P 1/12* (2006.01)
*A23G 3/02* (2006.01)
*B65D 35/00* (2006.01)
*B65D 35/38* (2006.01)
*B65D 25/40* (2006.01)
*A21C 15/00* (2006.01)
*A23G 3/28* (2006.01)

(52) U.S. Cl.
CPC .............. *A21C 15/005* (2013.01); *A23G 3/28* (2013.01)
USPC ........... 401/160; 401/152; 426/115; 426/516; 222/566

(58) Field of Classification Search
USPC .......................................... 401/152, 158, 160
See application file for complete search history.

(56) References Cited

U.S. PATENT DOCUMENTS

| | | |
|---|---|---|
| 1,717,151 A | 6/1929 | Genova |
| 2,968,262 A | 1/1961 | Lacey |
| 3,866,838 A | 2/1975 | Miles |
| 3,921,858 A | 11/1975 | Bemm |
| 4,258,866 A | 3/1981 | Bergman |
| 4,432,768 A * | 2/1984 | Brown et al. .................. 604/200 |
| 4,565,303 A * | 1/1986 | Gilbertson ..................... 222/103 |
| 4,581,021 A * | 4/1986 | Landau et al. ................ 604/212 |
| 4,961,517 A | 10/1990 | Tkac |
| 5,026,194 A * | 6/1991 | Lewis ............................ 401/261 |
| D335,069 S | 4/1993 | Capellan |
| 5,217,144 A | 6/1993 | Santefort et al. |
| 5,322,194 A * | 6/1994 | Roberts ......................... 222/103 |
| 5,335,591 A | 8/1994 | Pozar |
| 5,361,946 A | 11/1994 | Ginther et al. |
| 5,816,450 A | 10/1998 | Alexander et al. |
| 5,868,282 A | 2/1999 | Imhoff |
| 6,026,985 A | 2/2000 | Elliott, Sr. |
| 6,241,130 B1 | 6/2001 | Heiberger |
| 6,315,165 B1 * | 11/2001 | Regan .......................... 222/103 |
| 6,520,379 B1 | 2/2003 | Campbell |
| D496,216 S | 9/2004 | Morgan |
| 6,799,611 B2 | 10/2004 | Dittmar |
| 6,887,504 B2 | 5/2005 | Palmer et al. |
| D521,326 S | 5/2006 | Tellez |
| 7,077,292 B2 * | 7/2006 | Turano .......................... 222/103 |
| 7,516,872 B2 * | 4/2009 | Boone et al. ................. 222/212 |

(Continued)

*Primary Examiner* — David Walczak
*Assistant Examiner* — Joshua Wiljanen
(74) *Attorney, Agent, or Firm* — Thomas J. Nikolai; Nikolai & Mersereau, P.A.

(57) ABSTRACT

A decorating pen particularly useful for decorating cakes, pastries and other food items provides a reservoir containing a decorating material, a nozzle attached to the reservoir, a housing which holds the reservoir and a compression member pivotally attached to the housing member. A user holds the decorating pen in a fashion similar to a standard writing pen or pencil and squeezes the housing and compression member together to extrude the decorating material from the reservoir through the nozzle to write, draw, or color with the decorating pen.

18 Claims, 6 Drawing Sheets

(56) References Cited

U.S. PATENT DOCUMENTS

| | | |
|---|---|---|
| 2005/0098471 A1 | 5/2005 | Klundt |
| 2006/0292290 A1 | 12/2006 | Hester |
| 2007/0000943 A1 | 1/2007 | Morgan |
| 2007/0023456 A1 | 2/2007 | Jalali et al. |
| 2007/0215649 A1 | 9/2007 | Tirone et al. |
| 2008/0041878 A1 | 2/2008 | Day et al. |
| 2008/0041880 A1 | 2/2008 | Babineau et al. |
| 2008/0167681 A1* | 7/2008 | Stenton .......... 606/214 |
| 2008/0314923 A1 | 12/2008 | Faller et al. |
| 2011/0014373 A1 | 1/2011 | Perry |
| 2013/0004229 A1* | 1/2013 | Kirk et al. .......... 401/132 |

\* cited by examiner

DECORATING PEN

CROSS-REFERENCED TO RELATED APPLICATIONS

Not applicable.

STATEMENT REGARDING FEDERALLY SPONSORED RESEARCH OR DEVELOPMENT

Not applicable.

BACKGROUND OF THE INVENTION

I. Field of the Invention

The present invention relates to decorating cakes and other food products. More specifically, the present invention relates to decorating pens used to precisely extrude frosting, icing, or some other viscous material onto a substrate in an artistic fashion.

II. Related Art

Figure 2:
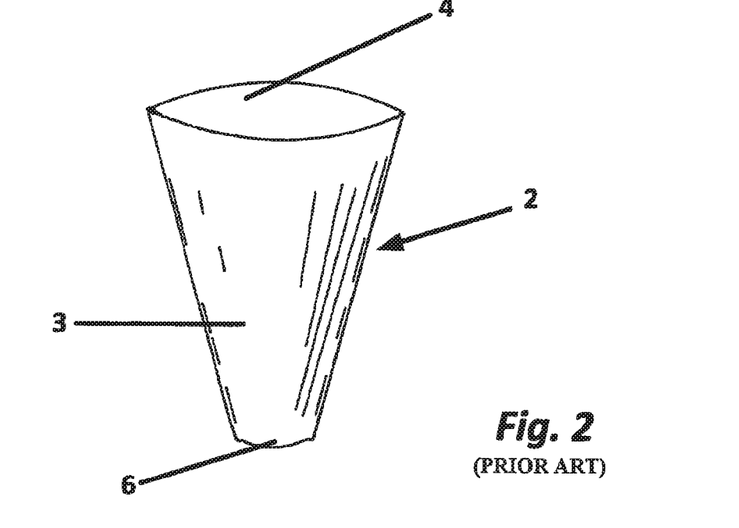
FIG. 2 is a perspective view of the bag shown in FIG. 1.

Methods of dispensing cake icing are well-known. One common method is to place the icing in a cone-shaped bag such as that shown in FIG. 2. Such bags may be made of paper, cloth, and plastic. Such bags have a large top opening through which the icing is inserted into the bag. The tip of the cone-shaped bag is typically cut off as shown in FIG. 2 to create an opening through which the icing can be squeezed from the bag.

Figure 3:
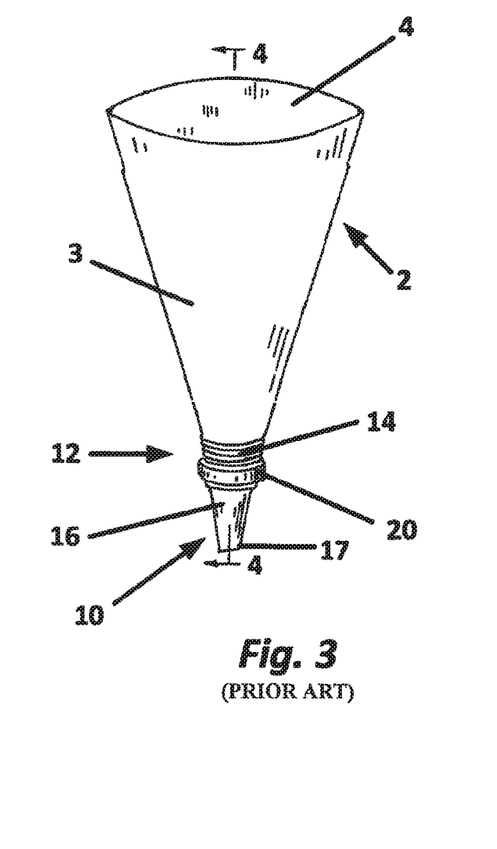
FIG. 3 is a perspective view of the bag of FIG. 2 with a typical nozzle and nozzle orifice attached.
Figure 4:
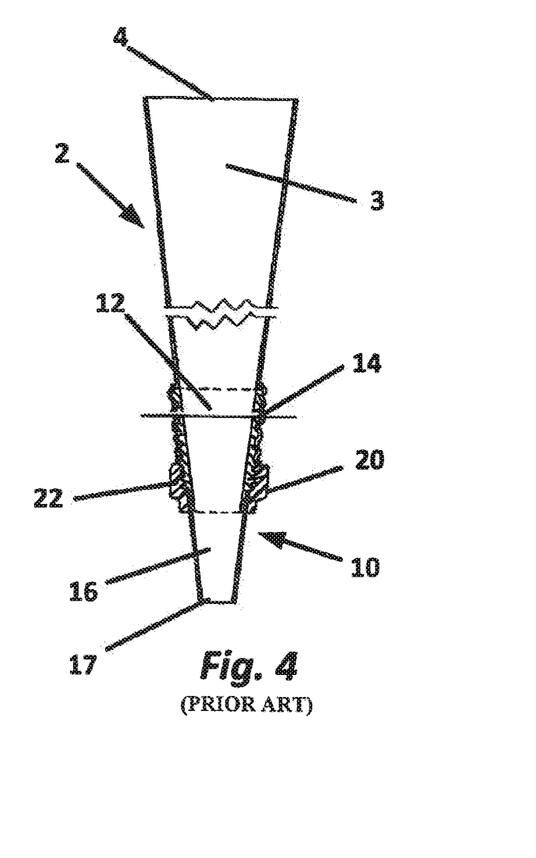
FIG. 4 is a cross-sectional view through line 4-4 of FIG. 3.

As shown in FIGS. 3-4, a nozzle can be coupled to the bag. The nozzle shown in FIGS. 3 and 4 has external threads which reside inside and adjacent a portion of the wall of the bag. A nut having internal threads is then coupled to the nozzle such that the portion of the bag wall is sandwiched between the threads of the nozzle and the threads of the nut. This not only serves to fasten the nozzle to the bag, but also ensures the icing will only exit the bag through the nozzle and not around the nozzle.

Figure 1:
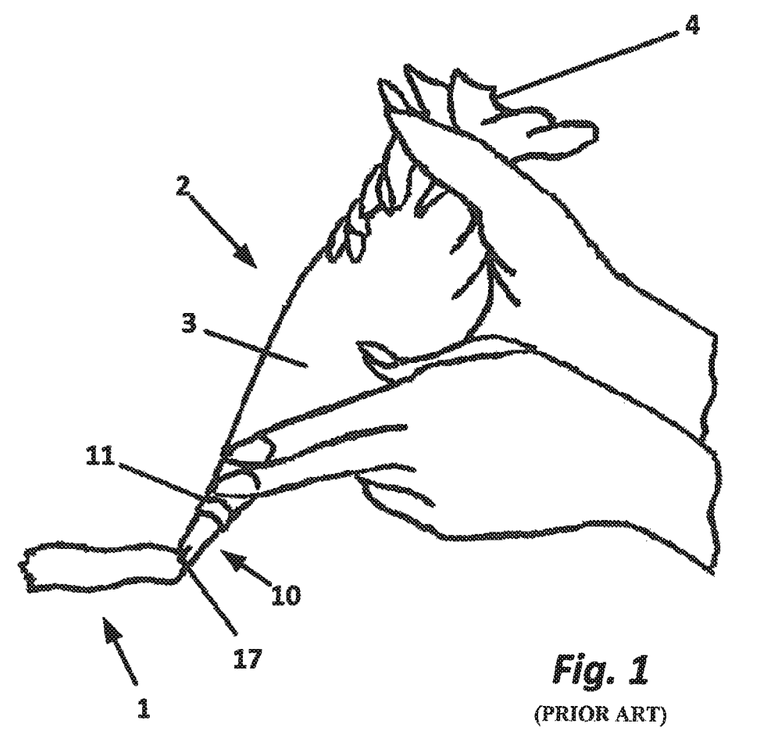
FIG. 1 is a perspective view showing a bag and nozzle arrangement typically employed in the prior art.

Once the nozzle is attached, the icing material is dispensed from the bag as shown in FIG. 1. Two hands are employed. One hand is used to steer the nozzle and the other hand is used to squeeze the bag and force material in the bag through the nozzle.

The foregoing method and apparatus requires great effort to squeeze the bag, which can be tiring, and a great deal of skill to move the tip about the item to be decorated to produce the desired result.

Various attempts have been made to address these problems. By way of example, commercial bakeries sometimes employ complex, expensive icing-dispensing systems such as those shown in U.S. Pat. No. 3,866,838 to Miles; U.S. Pat. No. 3,921,858 to Bemm, U.S. Pat. No. 5,816,450 to Alexander et al and U.S. Pat. No. 6,799,611 to Dittmar. These systems employ compressors or pumps to move the icing from a reservoir through the nozzle of an applicator. These systems are relatively complex, expensive and require substantial cleaning if the flavor or color of the icing is to be changed.

Others have employed modified caulking guns to dispense the icing. Examples are shown in U.S. Pat. No. 6,241,130 to Heiberger; U.S. Pat. No. 6,026,985 to Elliott, Sr.; U.S. Pat. No. 5,217,144 to Santefort et al; U.S. Pat. No. 4,258,866 to Bergman and U.S. Pat. No. 5,361,946 to Ginther et al. These typically are used with prepackaged, prefilled icing containers. These packages can be overly expensive. Sometimes users find it desirable to use colors or flavors when decorating not offered in such packages. Users of such devices also find it difficult to control the motion of the nozzle tip with precision while actuating the mechanism that advances the piston to push icing out of the gun.

Thus, there continues to exist a need for an inexpensive applicator which can be used with the full range of icing colors and textures available, which can be safely and easily used, which requires only a single hand for operation, and which provides ease of control and precision in the decorative application of icing, frosting, ice cream or other viscous foodstuffs.

SUMMARY OF THE INVENTION

The instant invention provides a decorating pen comprising a compressible reservoir having a proximal end, a distal end and a wall extending from the proximal end to the distal end, the reservoir containing a decorating material; a nozzle coupled to the distal end of the reservoir through which decorating material exits the reservoir; a housing having a proximal end having a hinge member, a distal end having a flange adjacent a distal opening, and a channel defined by a wall having a side opening; and a compression member pivotally coupled to the hinge member of the housing so that the compression member is movable with respect to the housing between a first position in which the side opening is exposed to permit the reservoir (and nozzle coupled to the reservoir) to be placed through the side opening and into the channel with a portion of the nozzle projecting through the distal opening and past the distal end of the housing and a second position in which at least a portion of the compression member resides within the channel of the housing, wherein as the compression member is moved from the first position to the second position the compression member engages the compressible reservoir so that the reservoir is squeezed between the housing wall and the compression member to force material within the reservoir out the nozzle.

The compression member of the decorating pen progressively engages the wall of the reservoir from the proximal end of the reservoir wall toward the distal end of the reservoir wall to move material within the reservoir toward and out the nozzle. Both the channel and the side opening of the housing are tapered. The compression member is also tapered in a manner corresponding to the taper of the housing and side opening to permit a portion of the compressible member to pass through the side opening. The compression member may also be provided with a recess to assist in positioning a finger of a user along the compression member. The hinge member which couples the housing to the compression member may be a pair of slots in the housing which engage a pair of pins projecting from the compression member. Both the housing and the compression member may be made from a plastic material.

The reservoir may be in the form of a collapsible bag. Such a bag may be made of a paper, cloth or a plastic material. The contents of the reservoir will, of course, depend on the nature of the item to be decorated. If the item to be decorated is a cake, pie or other pastry item, the decorating material in the reservoir should be edible, for example frosting, icing or ice cream.

The decorating pen's nozzle may take a variety of forms. For example, the nozzle may have exterior threads which cooperate with the internal threads of a nut to join the nozzle to the reservoir. The nozzle typically includes a nozzle orifice which defines the size and shape of the bead of decorating material extruded from the decorating pen as it is used. The nozzle orifice may be integrally formed with the remainder of the nozzle or may be a separate sleeve coupled to the main body of the nozzle. In the embodiments shown in the drawings, the nut not only fastens the nozzle to the reservoir, but also fastens the orifice to the main body of the nozzle.

The invention may also be employed in the form of a decorating kit. Such a kit may include (1) at least one compressible reservoir, (2) a plurality of selectable nozzle orifices providing differing nozzle openings, (3) a nozzle body used to couple a selected one of the nozzle orifices to the reservoir such that decorating material may exit the reservoir through the nozzle opening of the selected nozzle orifice, (4) a housing for holding the reservoir, nozzle and nozzle orifice; and (5) a compression member pivotally coupled to the housing so that the compression member is movable with respect to the housing between a first position which allows the reservoir, nozzle and selected nozzle orifice to be loaded into the housing and a second position such that as the compression member is moved from the first position to the second position, the compression member engages the compressible reservoir so that the reservoir is squeezed between a surface of the housing and the compression member to force material within the reservoir out of the opening of the nozzle orifice. The kit may also contain additional reservoirs and additional nozzles and nuts.

The construction and advantages of the present invention will become apparent from the following description in conjunction with the drawings.

DETAILED DESCRIPTION

FIGS. 2-4 show one type of reservoir and nozzle arrangement which may be used to supply icing, frosting, or other suitable edible material to the decorating pen shown in FIGS. 5-13. More specifically, FIG. 2 shows a reservoir consisting of a standard bag 2 which may be made of paper, cloth, plastic or other suitable material. The bag 2 comprises a frusto-conical wall 3, a proximal opening 4 and a distal opening 6. The distal opening is typically formed to an appropriate size by cutting away a portion of the wall 3 using a shears or the like.

As best illustrated in FIGS. 3 and 4, a nozzle 10 may be coupled to the bag 2 at the distal opening 6. The nozzle 10 has a main body 12 which has external threads 14 and resides at least partially within the bag 2. The nozzle 10 also has a nozzle orifice 16 which is either integrally formed with or coupled to the main body 12 and extends from the distal opening 6 in the bag 2. To secure the nozzle 10 to the bag 2 and prevent the contents of the bag from flowing around, rather than through, the nozzle 10 and a nut 20 having internal threads 22 is employed. As best illustrated in FIG. 4, a portion of the wall 3 of the bag 2 extends over at least a portion of the main body 12 of the nozzle 10 and the nozzle's threads 14 so that when the nut 20 is turned onto the threads 14 of the nozzle 10, that portion of the wall 3 is sandwiched and trapped between the threads 14 of the nozzle 10 and the threads 22 of the nut 20. The nut 20 may also be used in a similar manner to join a non-integrally formed nozzle orifice 16 to the main body 12 of the nozzle 10.

Once the nozzle 10 has been fastened to the distal opening 6 of the bag 2, icing or some other material to be extruded from the bag 2 through the nozzle 10, can be placed in the bag 2 through the proximal opening 4 of bag 2. The proximal opening 4 may then be sealed using an elastic band, a metal twist tie, or any other appropriate clip or fastener. Alternatively, the proximal end may be sealed by tying the proximal portion of wall 3 into a knot. The material is extruded through a distal opening 17 in the nozzle orifice 16. The size and shape of the distal opening 17 will help define the shape of the bead of material extruded. One advantage of using a non-integrally formed nozzle orifice 16 is that a plurality of nozzle orifices 16 may be provided, each having a distal opening 17 of a different size or shape. These non-integrally formed nozzle orifices 16 are selectable and interchangeable to increase the artistic options available to the user. Of course, a plurality of interchangeable nozzles 10, each having an integrally formed nozzle orifice having a distal opening 17 of a different size or shape, may be made available to provide this same advantage. A wide variety of nozzle orifices are available in the marketplace from a number of different suppliers such as Kaiser Bakeware, Sugarcraft, Inc. and Wilton Products, Inc.

FIGS. 5-10 show a decorating pen 30 which may be advantageously and more effectively used not only to extrude material from a reservoir such as bag 2 through the nozzle 10, but also to more precisely apply that material in a decorative fashion to a cake or other substrate.

Figure 5:
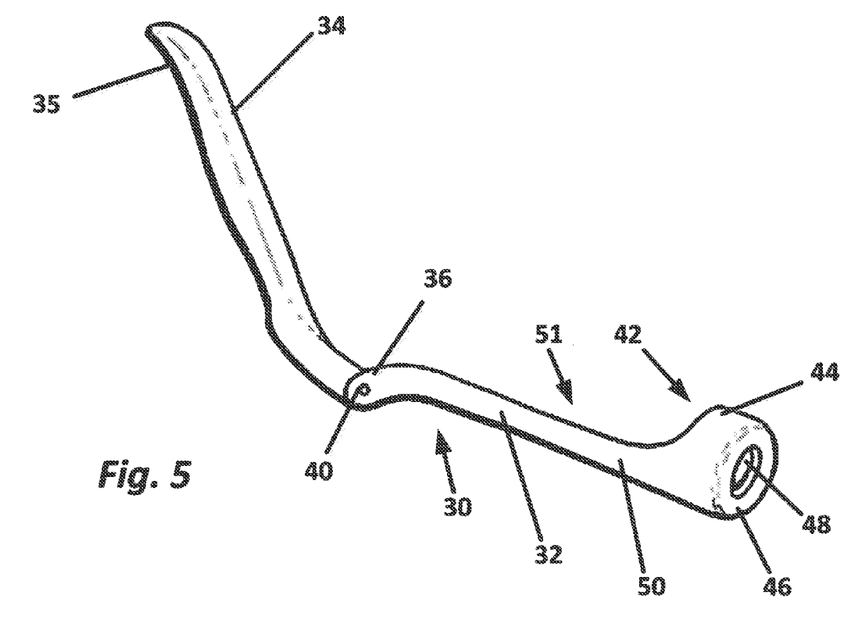
FIG. 5 is a perspective view of a decorating pen housing and compression member made in accordance with the subject invention.
Figure 6:
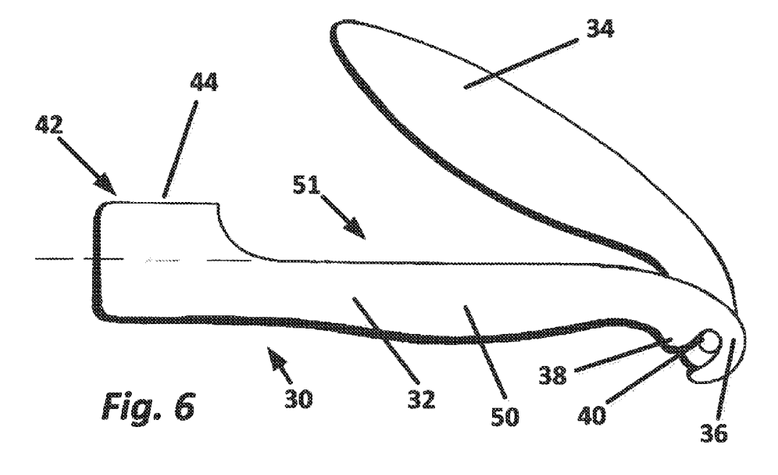
FIG. 6 is a side view of the decorating pen housing and compression member of FIG. 5.
Figure 7:
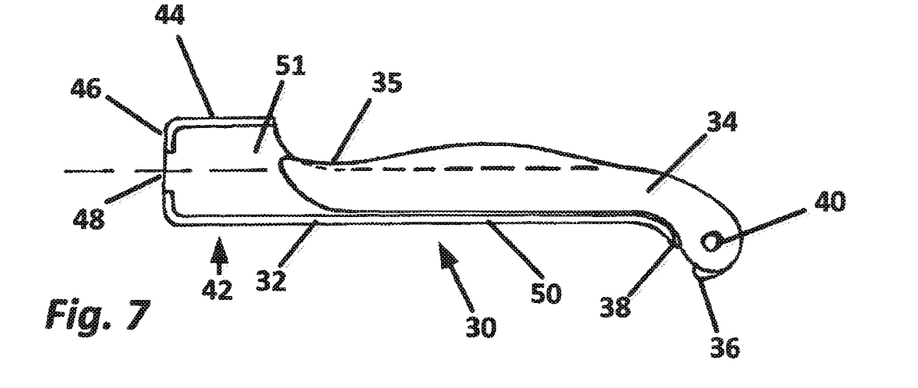
FIG. 7 is a cross-sectional view of the decorating pen housing and compression member of FIG. 5.
Figure 8:
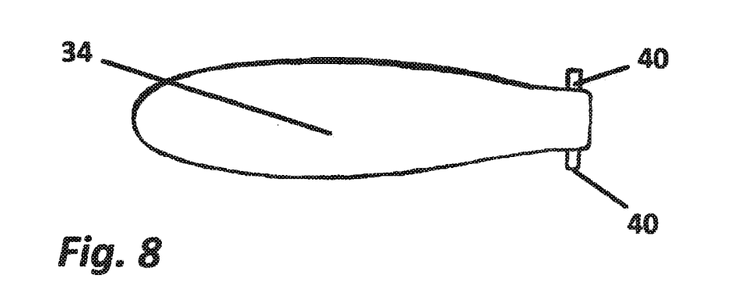
FIG. 8 is a top view of the compression member of FIG. 5.

The decorating pen 30 includes a housing 32 and a compression member 34 pivotally coupled to the housing 32. More specifically, the proximal end 36 of the housing 32 includes a pair of hinge slots or holes 38 which receive pins 40 which project from opposite sides of the compression member 34.

Figure 9:
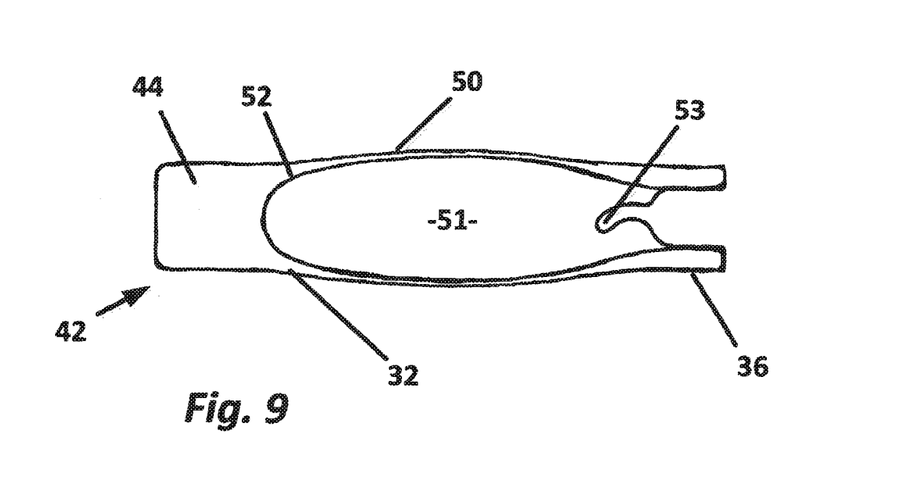
FIG. 9 is a top view of the housing of FIG. 5.
Figure 10:
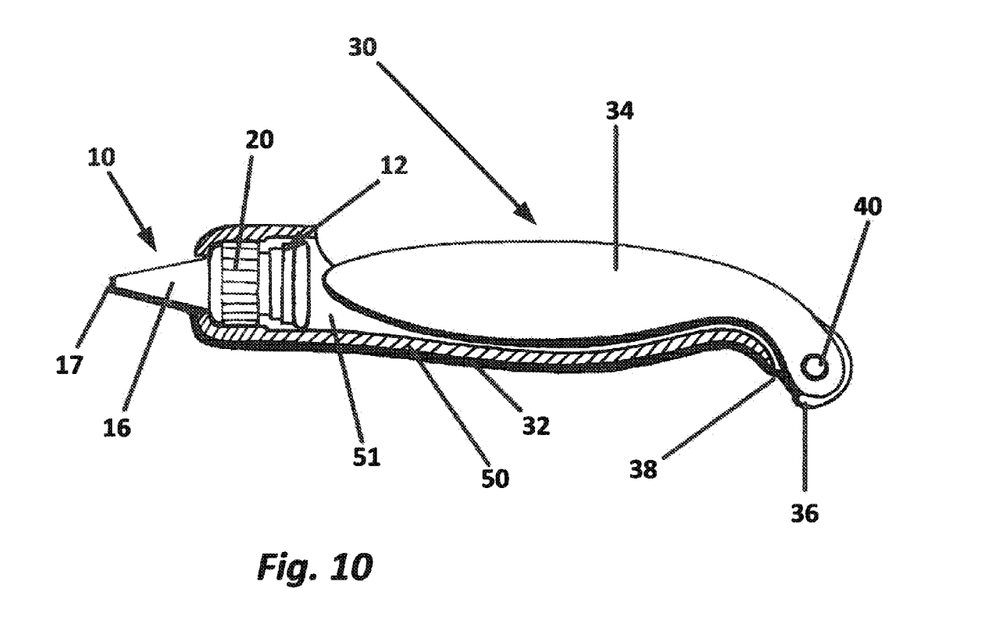
FIG. 10 is a cross-sectional view of the decorating pen housing and compression member of FIG. 5 with a bag and nozzle arrangement of the type shown in FIG. 3 inserted into the housing.

The distal end 42 of the housing 32 has a cylindrical member 44 and a flange 46 extending inwardly from the most distal portion of the cylindrical member. The flange 46 surrounds a nozzle-receiving opening 48. The housing 32 also includes a tapered wall 50 extending from the proximal end 36 to the distal end 42. The tapered wall 50 defines a channel 51 extending from within the cylindrical member 44 toward the proximal end 36. The wall 50 also defines a tapered side opening 52 as best shown in FIG. 9. As best shown in FIG. 10, a reservoir such as bag 2 coupled to a nozzle 10 can be inserted into the channel 51 such that the nozzle 10 resides in the cylindrical member 44 with the nozzle orifice 16 of the nozzle 10 projecting through the nozzle-receiving opening 48. The flange 46 engages a portion of the nozzle 10 or the nut 20 to prevent the entirety of the nozzle 10 from passing through the opening 48. When so inserted, the bag 2 and the contents of the bag 2 generally reside in the channel 51.

As shown in FIG. 9, the housing 32 may also be provided with a slot 53 extending through the housing wall 50 inwardly from the proximal end 36 of the housing 32. As shown, slot 53 is curved. The proximal end of wall 3 of the bag 2 can be inserted in this slot 53 to close the proximal opening 4 of the bag 2, to prevent the proximal end of bag 2 from interfacing with the motion of compression member 34, or otherwise to assist in ensuring the material within the bag 2 only exits the reservoir positioned in channel 51 through the nozzle 10.

As noted above, the compression member 34 pivots about the hinge formed by slots or holes 38 and pins 40. More specifically, the compression member 34 is movable between a first position (see FIG. 5) and a second position (see FIG. 7). When compression member 34 is in the first position, the side opening 52 in the wall 50 is exposed to permit the reservoir (e.g., bag 2) and attached nozzle 10 to be placed through the side opening 52 into the channel 51 with a portion of the nozzle 10 projecting through the distal opening 48 and past the distal end 42 of the housing 32. After the nozzle 10, a reservoir (such as bag 2) and the reservoir's contents have been positioned with respect to the housing 32 as described above, the compression member 34 is rotated until it first engages the reservoir. The decorating pen is then gripped much like an ordinary writing utensil with the housing 32 and compression member 34 between the thumb and forefinger of the user's writing hand. By squeezing the housing 32 and compression member 34 together as the user writes, material is ejected from the bag 2 through the distal opening 17 of the nozzle orifice 16 of the nozzle 10 making decorating a cake or other item using the material in the bag 2 a simple task.

As should be appreciated from the drawings, the compression member 34 and the wall 50 and side opening 52 in the housing 32 to the channel 51 are tapered and shaped such that the compression member 34 may be received within the channel 51. This permits substantially all of the contents of the bag 2 to be forced from the bag 2 and out the nozzle 10. Further, the design of the housing 32 and compression member 34 are such that compression member 34 progressively engages the wall of the bag 2 from the proximal end to the distal end of the bag 2 as the compression member 34 and housing 32 are rotated together so the material within bag 2 is forced toward the nozzle 10. This prevents undue pressure on the means used to close the proximal opening 4 of the bag 2 which otherwise could cause material to escape from the bag 2 through the proximal opening 4.

When the present invention is employed to decorate cakes, a cake decorator may fill a plurality of bags 2 with different colored icings or materials to provide a color pallet comprising a plurality of colors. Likewise, a plurality of nozzles having distal openings 17 in the nozzle orifice 16 of different sizes and shapes may be attached to the bags 2 to provide beads of extruded materials of differing sizes and shapes. These bags 2 and the attached nozzles 10 can quickly and easily be inserted into and removed from the decorating pen 30. Also, since all of the material remains in the bag 2 until ejected through the nozzle 10, cleaning of the decorating pen 30 is not an issue. The housing, compression member, and nozzles of decorating pen 30 are made of materials and have surfaces which are easily cleaned. The bags 2 are disposable. Also, the compression member 34 and the housing 32 may be easily separated from each other for cleaning purposes when necessary.

For comfort and ease of use, both the wall 50 of housing 32 and the compression member 34 are ergonomically tapered so the decorating pen 30 fits well within the hand. The taper of compression member 34 conforms to the taper of the wall 50 and slot 52 so at least a portion of the compression member 34 may pass through the slot to fully compress the reservoir in the channel 51 to more completely empty the contents of the reservoir. For control, the compression member 34 may have a recess 35 (see FIGS. 5 and 7) which is intended to receive the index finger of the user. Likewise, the length of the housing 32 and compression member 34 are sufficient to ensure the proximal end 36 of the housing 32, which curves downwardly to position the hinge slot or hole 38 advantageously, does not interfere with comfortably gripping the decorating pen 30. Also, the length of the housing 32 permits the portion of the bag 2 extended through the slot 53 to pass between the downwardly curved portion of the proximal end 36 and the user's hand.

Figure 11:
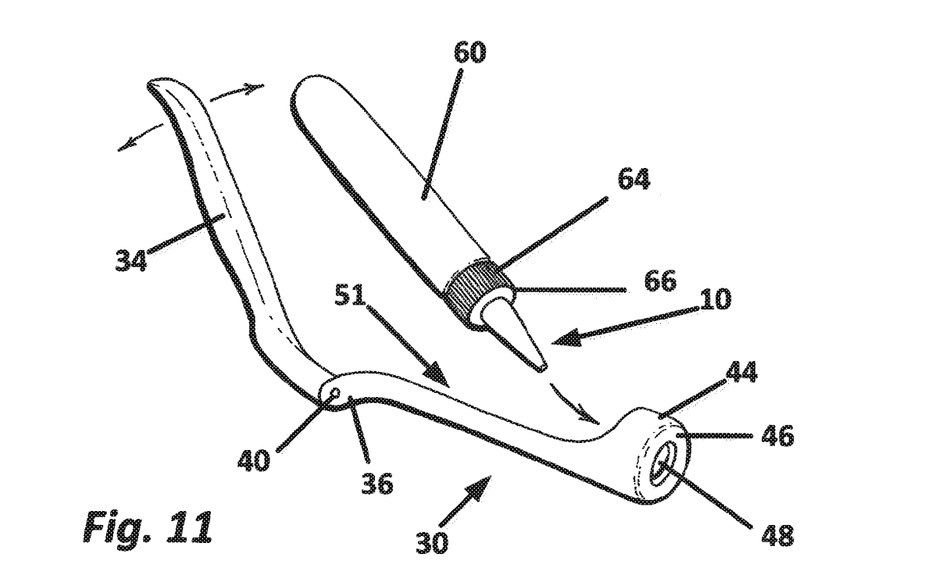
FIG. 11 is a perspective view of an alternative embodiment.
Figure 12:
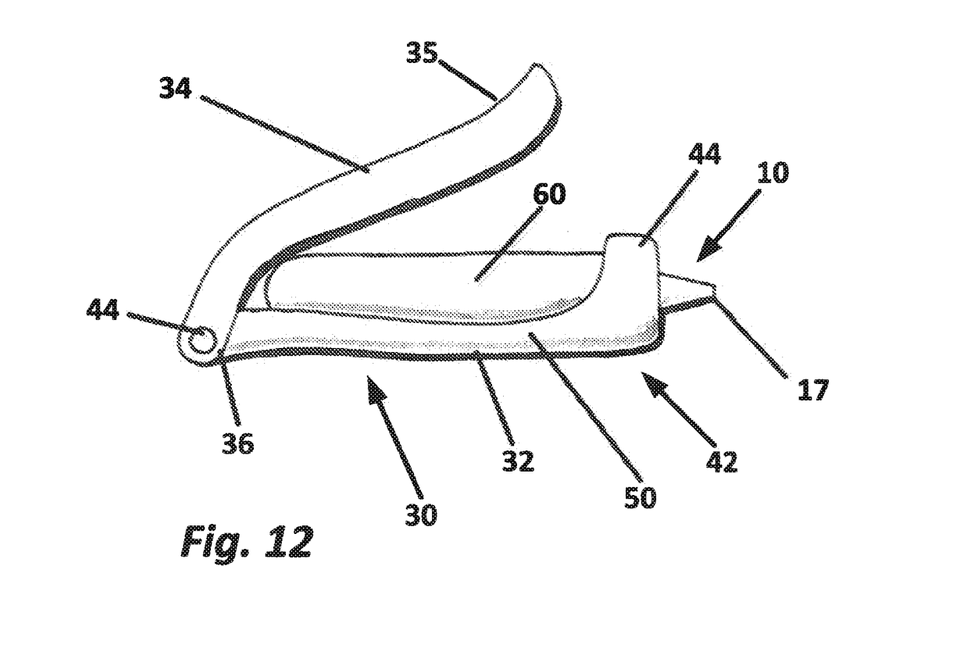
FIG. 12 is a side view of the embodiment shown in FIG. 11.

FIGS. 11 and 12 show an alternative reservoir arrangement in which a tube 60 with a nozzle 10 is used to hold the material to be applied using the decorating pen 30. The walls 62 of the tube should be pliable so that the tube 60, like the bag 2, can be compressed between the housing 32 and the compression member 34 to force the contents of the tube 60 through the nozzle 10 in a controlled manner. As shown, the tube 60 has a nozzle 10 comprising a cap 64 from which the nozzle orifice 16 projects. The cap 64 has a flange 66 which engages the flange 46 of the housing 32 as the nozzle orifice 16 of the nozzle 10 projects through opening 48 of the housing 32. This arrangement serves to retain the tube 60 in the channel 51 of housing 32 as the compression member 34 and housing 32 are squeezed together to cause the material within the tube 60 to flow through and out the nozzle 10.

From the foregoing, it should be clear that one can write, print, draw, or color with the decorating pen 30 in a fashion similar to that employed when using an ordinary pen or pencil. The decorating pen is gripped in substantially the same way. The nozzle is moved in substantially the same fashion as the writing tip of a pen or pencil. The only difference is that the user squeezes the housing 32 and compression member 34 together between the forefinger and thumb of the hand to cause and control the flow of decorating material from the nozzle 10 as the user imparts a writing, printing, drawing or coloring motion to the nozzle.

Those skilled in the art will appreciate various modifications and alternative embodiments may be made without deviating from the invention. The foregoing description is not intended to be limiting, but instead is provided to meet the disclosure requirements of the Patent Laws. Only the following claims, when afforded a full range of equivalents, define the invention.

What is claimed is:

1. A decorating tool comprising a compressible reservoir having a proximal end, a distal end and a wall extending from the proximal end to the distal end, the reservoir containing a decorating material; a nozzle coupled to the distal end of the reservoir through which decorating material exits the reservoir; a housing having a proximal end having a hinge member, a distal end having a flange adjacent a distal opening, a channel defined by a wall having a side opening, and a slot extending through the wall inwardly from the proximal end of the housing for receiving the proximal end of the reservoir; and a compression member pivotally coupled to the hinge member of the housing so that the compression member is movable with respect to the housing between a first position in which the side opening is exposed to permit the reservoir and nozzle coupled to the reservoir to be placed through the side opening and into the channel with a portion of the nozzle projecting through the distal opening and past the distal end of the housing and a second position in which at least a portion of the compression member resides within the channel of the housing, wherein as the compression member is moved from the first position to the second position the compression member engages the compressible reservoir so that the reservoir is squeezed between the housing wall and the compression member to force material within the reservoir out the nozzle.

2. The decorating tool of claim 1 wherein the compression member progressively engages the wall of the reservoir from the proximal end of the wall toward the distal end of the wall to move material within the reservoir toward and out the nozzle.

3. The decorating tool of claim 1 wherein the slot is curved.

4. The decorating tool of claim 1 wherein the housing wall and the side opening are tapered.

5. The decorating tool of claim 4 wherein the compression member is tapered in a manner corresponding to the tapered wall and side opening of the housing to permit a portion of the compressible member to pass through the side opening.

6. The decorating tool of claim 1 wherein the compression member has a recess to assist in positioning a finger of a user.

7. The decorating tool of claim 1 wherein the hinge member includes a pair of slots in the housing which engage a pair of pins projecting from the compression member.

8. The decorating tool of claim 1 wherein the reservoir is a collapsible bag.

9. The decorating tool of claim 8 wherein the bag is made of a material selected from paper, cloth or plastic.

10. The decorating tool of claim 1 wherein the decorating material is edible.

11. The decorating tool of claim 1 wherein the decorating material is selected from frosting, icing or ice cream.

12. The decorating tool of claim 1 wherein the housing and the compression member are made from a plastic material.

13. The decorating tool of claim 1 wherein the nozzle has exterior threads and further including a nut having internal threads used to join the nozzle to the reservoir.

14. The decorating tool of claim 1 wherein the nozzle includes a selectable nozzle orifice.

15. A decorating kit comprising:
   a. at least one compressible reservoir for containing a decorating material, the reservoir having a proximal end, a distal end and a wall extending from the proximal end to the distal end;
   b. a plurality of nozzle orifices providing differing nozzle openings;
   c. a nozzle body used to couple a selected one of the nozzle orifices to the distal end of the reservoir such that decorating material can exit the reservoir through the nozzle opening of the selected nozzle orifice
   d. a housing having a proximal end having a hinge member, a distal end having a flange adjacent a nozzle receiving opening, a wall defining a channel and a side opening to the channel, and a slot extending through the wall inwardly from the proximal end of the housing for receiving the proximal end of the reservoir; and
   e. a compression member pivotally coupled to the hinge member of the housing so that the compression member is movable with respect to the housing between a first position in which the side opening to the channel is exposed to permit the reservoir and nozzle coupled to the reservoir to be placed in the channel such that a portion of the selected nozzle orifice projects through the nozzle receiving opening of the housing and past the distal end of the housing and a second position in which at least a portion of the compression member resides within the channel of the housing, wherein as the compression member is moved from the first position to the second position the compression member engages the compressible reservoir so that the reservoir is squeezed between the wall of the housing and the compression member to force material within the reservoir out the nozzle opening of the selected one of the orifices.

16. The decorating kit of claim 15 further comprising at least one additional compressible reservoir.

17. The decorating kit of claim 16 wherein each compressible reservoir may contain a different decorative material.

18. The decorating kit of claim 16 further comprising at least one additional nozzle body.

\* \* \* \* \*